(12) United States Patent
Doshi et al.

(10) Patent No.: US 9,736,898 B2
(45) Date of Patent: Aug. 15, 2017

(54) CIRCUIT AND METHOD FOR DRIVING A LIGHT-EMITTING DIODE

(71) Applicant: Texas Instruments Incorporated, Dallas, TX (US)

(72) Inventors: Montu Virendra Doshi, Boulder, CO (US); Steven Michael Barrow, Longmont, CO (US)

(73) Assignee: Texas Instruments Incorporated, Dallas, TX (US)

( * ) Notice: Subject to any disclaimer, the term of this patent is extended or adjusted under 35 U.S.C. 154(b) by 570 days.

(21) Appl. No.: 13/689,552

(22) Filed: Nov. 29, 2012

(65) Prior Publication Data

US 2013/0249440 A1 Sep. 26, 2013

Related U.S. Application Data

(60) Provisional application No. 61/615,057, filed on Mar. 23, 2012.

(51) Int. Cl.
*H05B 37/02* (2006.01)
*H05B 33/08* (2006.01)

(52) U.S. Cl.
CPC ..... *H05B 33/0842* (2013.01); *H05B 33/0815* (2013.01); *H05B 33/0845* (2013.01); *H05B 37/02* (2013.01)

(58) Field of Classification Search
CPC ............ H05B 33/0854; H05B 33/0815; H05B 33/0818; H05B 33/0842; H05B 33/086; H05B 33/0872; H05B 33/089; H05B 33/0809; H05B 33/0839; H05B 33/0851; H05B 33/0866; H05B 33/0845; H05B 37/02; H05B 33/08

USPC ........ 315/185 R, 192, 195, 200 R, 201–207, 315/210, 250, 272, 291, 294, 297, 308, 315/312, 307
See application file for complete search history.

(56) References Cited

U.S. PATENT DOCUMENTS

| | | | |
|---|---|---|---|
| 2002/0030455 A1* | 3/2002 | Ghanem | G01R 31/2653 315/291 |
| 2010/0090618 A1 | 4/2010 | Veltman | |
| 2010/0134040 A1* | 6/2010 | Elder | H05B 33/0827 315/294 |
| 2010/0141178 A1* | 6/2010 | Negrete et al. | 315/307 |
| 2011/0037399 A1* | 2/2011 | Hung et al. | 315/219 |
| 2011/0074306 A1* | 3/2011 | Tai | 315/287 |
| 2011/0115412 A1 | 5/2011 | Welten | |
| 2011/0156593 A1 | 6/2011 | De Greef et al. | |
| 2011/0216559 A1* | 9/2011 | Ng et al. | 363/21.13 |
| 2011/0241548 A1* | 10/2011 | Tsai | 315/117 |

(Continued)

OTHER PUBLICATIONS

PCT Search Report mailed Jul. 11, 2013.

(Continued)

*Primary Examiner* — Tung X Le
(74) *Attorney, Agent, or Firm* — William B. Kempler; Charles A Brill; Frank D. Cimino (57) ABSTRACT

Circuits and methods for driving an LED from a secondary side of a transformer are disclosed herein. An embodiment of the method includes monitoring an input voltage to determine the power level intended to drive the LED. The current flow through the primary side of the transformer is adjusted to make the power actually driving the LED equal to the power intended to drive the LED.

20 Claims, 7 Drawing Sheets

(56) References Cited

U.S. PATENT DOCUMENTS

| | | |
|---|---|---|
| 2011/0241557 A1 | 10/2011 | Grotowski et al. |
| 2011/0266967 A1* | 11/2011 | Bordin et al. ............... 315/287 |
| 2011/0309759 A1* | 12/2011 | Shteynberg et al. ......... 315/201 |
| 2012/0032605 A1* | 2/2012 | Peng ............................ 315/219 |
| 2012/0139438 A1* | 6/2012 | Soleno ......................... 315/291 |
| 2012/0242242 A1* | 9/2012 | Linz .................. H05B 33/0815 |
| | | 315/210 |
| 2012/0243271 A1* | 9/2012 | Berghegger ............... 363/21.15 |
| 2012/0256553 A1* | 10/2012 | Chen et al. ................... 315/205 |
| 2013/0002156 A1* | 1/2013 | Melanson ......... H05B 33/0815 |
| | | 315/186 |
| 2013/0119869 A1* | 5/2013 | Peng ............................ 315/125 |

OTHER PUBLICATIONS

Werner Thomas and Johannes Pforr, "Buck-Boost Converter Topology for Paralleling H-LEDs Using Constant-Power Operation," University of Applied Sciences Ingolstadt, Ingolstadt, Germany, pp. 568-573.

Ting Jiang; Hulong Zeng; Junming Zhang and Zhaoming Qian, "A Primary Side Feedforward Control Scheme for Low Power LED Driver Compatible With Triac Dimmer," College of Electrical Engineering, Zhejiang University, Hangzhou, China, 2012 IEEE, pp. 963-968.

* cited by examiner

CIRCUIT AND METHOD FOR DRIVING A LIGHT-EMITTING DIODE

This application claims priority to U.S. provisional patent application 61/615,057 of Montu V. Doshi, filed on Mar. 23, 2012, for LED DRIVER WITH CONSTANT POWER REGULATION CONTROL SCHEME, which is hereby incorporated by reference for all that is disclosed therein.

BACKGROUND

Light-emitting diodes (LEDs) emit light when a forward current is passed through them. The light intensity, which may be referred to as the luminous flux, radiant flux, or simply the lumens, output by an LED is proportional to the forward current. As with most diodes, LEDs have a forward voltage, which, in ideal circumstances, the forward voltage remains constant, so the light intensity is proportional to the forward current, which will also be constant. Therefore, in ideal circumstances, the intensity of light output by an LED is very predictable and constant because it is related to a constant forward current.

In real circumstances, the forward voltage of an LED is not constant over time or from one LED to another. For example, as an LED ages, its forward voltages may decrease. Likewise, as the temperature of an LED increases, its forward voltage decreases. When the forward voltage of an LED decreases and the forward current is maintained constant, the light intensity emitted by the LED decreases. The opposite occurs when the forward voltage of an LED increases. With a constant forward current, more power is delivered to the LED and the intensity of light emitted by the LED increases.

SUMMARY

Circuits and methods for driving an LED from a secondary side of a transformer are disclosed herein. An embodiment of the method includes monitoring an input voltage to determine the power level intended to drive the LED. The current flow through the primary side may be related to the voltage input to the circuit from a dimmer. The current flow through the primary side of the transformer is adjusted to make the power driving the LED equal to the power intended to drive the LED.

DETAILED DESCRIPTION

Circuits and methods for driving light-emitting diodes (LEDs) are disclosed herein. The circuits receive power from a power source, such as a sinusoidal line voltage. In some embodiments, the line voltage is clipped due to the affects of dimming. For example, a conventional dimmer using a triac may clip the sinusoidal line voltage. The circuits and methods analyze the line voltage to determine the power that is intended to be delivered to the LEDs. The power intended to be delivered to the LEDs is may be set by a user who moves a rotary or slide switch of the type commonly used with dimmers. The intended power may then be related to the voltage output by the switch. For example, the intended power may be related to the clipped voltage output by a conventional light dimmer. The circuits output the intended power to the LEDs irrespective of the forward voltage or current of the LEDs. By outputting a specific power to the LEDs, the intensity of light emitted by the LEDs is maintained, irrespective of changes in the forward voltages of the LEDs.

Figure 1:
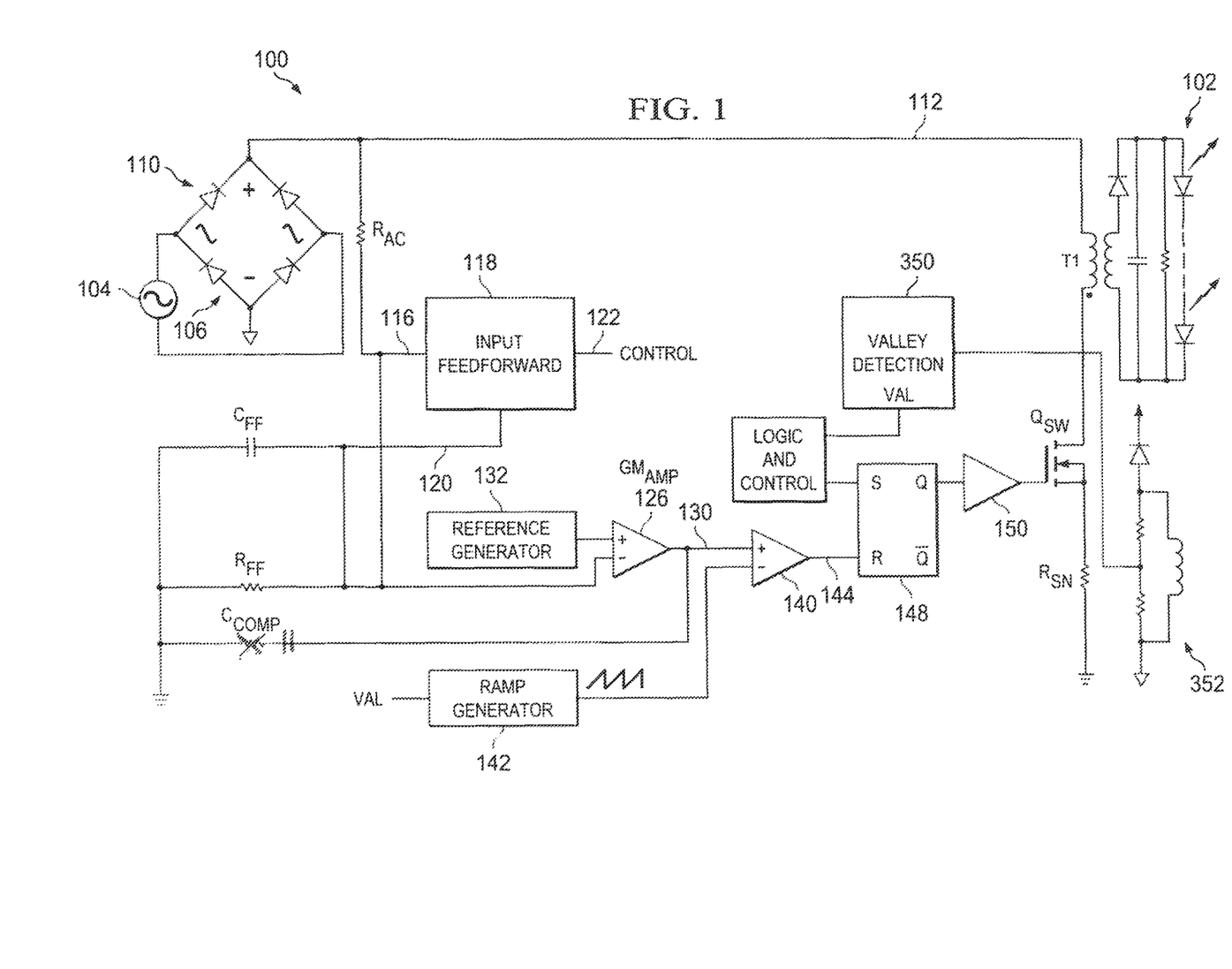
FIG. 1 is a block diagram of an embodiment of a circuit for driving LEDs.

A block diagram of an embodiment of a circuit 100 for driving LEDs 102 is disclosed in FIG. 1. The circuit 100 receives a line voltage 104 by way of an input 106. The line voltage 104 may be a sinusoidal line voltage such as a 110 v, 60 Hz or 220, 50 Hz AC voltage. The line voltage 104 may be associated with a dimmer (not shown), such as a triac. The triac or other dimmer may clip the line voltage 104 so that the sinusoidal AC voltage only conducts for a portion of each cycle. This portion of the cycle where the line voltage 104 conducts is referred to as the conduction angle. At a conduction angle of 180 degrees, the LEDs 102 are intended to operate at full power without any dimming. At lower conduction angles less power is intended to be delivered to the LEDs 102 so their light intensity is reduced.

The input 106 is connected to a rectifier 110, which is shown in FIG. 1 as being a full wave rectifier. The rectified voltage is output from the rectifier 110 onto a line 112, which is referenced to ground. The line 112 is connected to a resistor $R_{AC}$ and to the primary side of a transformer T1. In some embodiments, other components may be connected to the line 112 or in series with the line 112. The function of the resistor $R_{AC}$ is described in greater detail below. The primary side of the transformer T1 is connected to ground by way of a current regulator that is referred to as switch $Q_{SW}$. A current sensing resistor $R_S$ is connected in series with the switch $Q_{SW}$ and the primary side of the transformer. In the embodiment described herein, the switch $Q_{SW}$ is a field effect transistor (FET), but it could be any electronic switching device. Current flow through the primary side of the transformer T1 is controlled by the switch $Q_{SW}$.

The secondary side of the transformer T1 is connected to the LEDs 102. The transformer T1 may have a gain (n) that is dependent on the primary and secondary windings. A unique element of the circuit 100 is that the power delivered to the LEDs 102 is controlled by the switch $Q_{SW}$, which controls the primary side of the transformer T1. By controlling the power on the primary side of the transformer T1, the power delivered to the LEDs 102 is maintained substantially constant irrespective of changes in the forward voltage of the LEDs 102 or the current flow through the LEDs 102. Therefore, the intensity of light emitted by the LEDs 102 is able to be maintained at a constant or predetermined intensity. It is noted that the power to the LEDs 102 may also be maintained constant even with fluctuations in the level of the line voltage 104.

The resistor $R_{AC}$ is connected to an input 116 of a feedforward circuit 118. The feedforward circuit 118 has an output 120 and a second input 122. The input 122 is referred to as the control line and has a voltage that is proportional to the duty cycle of the switch $Q_{SW}$. The feedforward circuit 118 may have other inputs and outputs that are used for angle detection and other signals that are described in greater detail below. The output 120 is sometimes referred to as the feedforward output. In order to protect the circuitry from high current, the current at the output 120 is reduced. In the embodiment of FIG. 1, the current is reduced by one tenth. The current at the output 120 is also multiplied by the duty cycle of the switch $Q_{SW}$. The voltage on the output 120 is the product of the duty cycle of the switch $Q_{SW}$ and the rectified line voltage received at the input 116.

The output 120 is connected to a resistor $R_{FF}$ and a capacitor $C_{FF}$ that are connected in parallel to ground. The output 120 is also connected to the inverting input of an amplifier 126. The resistor $R_{FF}$ is used in series with the resistor $R_{AC}$ to set a power reference of the input as described below. The resistor $R_{FF}$ also determines a voltage on the inverting input of the amplifier 126 that is compared to the voltage on the non-inverting input of the amplifier 126. The capacitor $C_{FF}$ serves to form a low-pass filter with the resistor $R_{FF}$. The low-pass filter is used to attenuate twice the frequency of the line voltage 104, which is the frequency of the rectified voltage on the line 112. In some embodiments, a pole is set at between 10 Hz and 12 Hz to achieve approximately 20 dB attenuation at twice the frequency of the line voltage 104. Accordingly, the voltage at the inverting input to the amplifier 126 is the DC component, or RMS value, of the rectified line voltage 104 multiplied by the duty cycle of the switch $Q_{SW}$.

The amplifier 126 may be a GM error amplifier that has an output 130. The inverting input of the amplifier 126 is connected to the output 120 of the feedforward circuit 118. The non-inverting input is connected to a reference generator 132. The reference generator 132 is described in greater detail below. In summary, the reference generator 132 generates a voltage that is proportional to the power intended to be delivered to the LEDs 102, which is the light intensity intended to be output by the LEDs 102. By monitoring the power intended to be delivered to the LEDs 102, the power output to the LEDs 102 is regulated accordingly. When voltage at the input 106 has not been dimmed, the reference voltage on the non-inverting input of the amplifier 126 may be set to a predetermined voltage, such as one volt.

The output 130 of the amplifier 126 is connected to the non-inverting input of a comparator 140 and to a capacitor $C_{COMP}$. The inverting input of the comparator 140 is connected to a ramp generator 142. The ramp generator 142 generates a ramp wave wherein the voltage at the non-inverting input is within the high voltage and low voltage of the ramp wave. The voltage at the output 144 of the amplifier 140 is a pulse width modulated (PWM) signal wherein the duty cycle is proportional to the voltage at the output 130 of the amplifier 126. The capacitor $C_{COMP}$ provides slow integral compensation. The capacitor $C_{COMP}$ may have a value of between 4.7 μF and 10 μF to achieve a low bandwidth loop of 1 Hz to 10 Hz The output 144 of the comparator 140 may be connected to a latch 148, which in the embodiment of FIG. 1 is an SR latch 148. More specifically, the output 144 is connected to the reset (R) of the latch 148 and the set (S) of the latch 148 is connected to other circuits that are described in greater detail below. Therefore, the output (Q) of the latch 148 is the PWM signal generated by the amplifier 144 so long as (S) is set appropriately. The output (Q) is connected to a buffer 150 that drives the gate of the switch $Q_{SW}$. It is noted that in some embodiments, the latch 148 is not used and the output 144 of the comparator 140 is connected directly to the buffer 150 or the gate of the switch $Q_{SW}$. The circuits that control the switch $Q_{SW}$ and/or monitor the rectified voltage are sometimes referred to collectively as the control circuit.

Having described the basic circuit 100 for driving the LEDs 102, its operation and design with no dimming will now be described. As described above, the purpose of the circuit 100 is to maintain a constant power to the LEDs 102 irrespective of changes in their forward voltages. Additionally, the circuit 100 maintains a constant power to the LEDs 102 even when the line voltage 104 varies.

In a conventional circuit, the power received at the primary side of the transformer T1 is proportional to the product of the voltage and current at the primary side. If the current or voltage in the primary side drops, the power on the primary side drops accordingly. It follows that the power on the secondary side and the power delivered to devices connected to the secondary side also drops. In the case of LEDs, the reduced power causes the intensity of light emitted by the LEDs to drop. The reverse occurs if the voltage or current on the primary side of the transformer rises. The circuit 100 overcomes the above described problems by maintaining a predetermined power draw from the line voltage 104, which is the power on the primary side of the transformer T1.

The voltage on the output 120, which is the product of the DC component of the rectified line voltage and the control signal generated by the feedforward circuit 118, is input to the inverting input of the amplifier 126. The amplifier 126 compares the inverting input to the reference voltage, which may be set to one volt for non-dimming operation. A PWM signal is generated based on the output of the comparator 140 wherein the PWM signal drives the switch $Q_{SW}$. Because the switch $Q_{SW}$ is driven with a PWM signal, the duty cycle of the primary side of the transformer T1 is the duty cycle of the PWM signal. This PWM signal is used as the control signal that is at the input 122 of the feedforward circuit 118. If the line voltage 104 drops, the voltage at the inverting input to the amplifier 126 will drop. This voltage drop causes the amplifier 126 to generate a longer duty cycle with the PWM signal. Thus, the current through the primary side of the transformer T1 increases. The result is the input power to the primary side of the transformer T1 is maintained, so the power on the secondary side is also maintained. The opposite occurs if the line voltage 104 increases.

The circuit 100 will now be described in greater detail. The line voltage 104 is rectified and the rectified current is passed through the resistor $R_{AC}$ and to the feedforward circuit 118 where the current is reduced. In the embodiment of FIG. 1, the current reduction is 10:1. The voltage at the input 116 of the feed forward circuit 118 is also multiplied by the duty cycle of the switch $Q_{SW}$. The low pass filter of $C_{FF}$ and $R_{FF}$ filter the AC component of the voltage at the output 120 to yield the average DC component of the rectified line voltage multiplied by the duty cycle at the inverting input to the amplifier 126.

The resistance ratio of $R_{FF}/R_{AC}$ may be calculated using the following equation:

$$\frac{R_{FF}}{R_{AC}} = \frac{\pi}{4} \frac{G_{FF} V_{REF}}{\sqrt{L_M P_{IN} f_s}} \quad \text{Equation (1)}$$

where $G_{FF}$ is the feedforward gain, which is ten in the embodiment described herein; $V_{REF}$ is the reference voltage; $L_M$ is the magnetizing inductance of the transformer T1; $P_{IN}$ is the input power of the circuit 100; and $f_S$ is the switching frequency of the ramp generator 142.

In order to maximize the power factor of the circuit 100, the energy in the primary side of the transformer T1, or the magnetizing inductance $L_M$, should be reset on every cycle. In addition, the circuit 100 should operate in a discontinuous conduction mode (DCM) for the power level $P_{IN}$ over the range of input voltages. Based on the foregoing, the magnetizing inductance $L_M$ of the transformer T1 may be selected as follows:

$$L_M \leq \frac{V_{REF}}{4 P_{IN} f_s \left( \frac{1}{n V_{OUT}} + \frac{1}{V_{REC(PK,MIN)}} \right)^2}, \quad \text{Equation (2)}$$

$L_M \leq V_\downarrow REF/(4P_\downarrow IN \quad f_\downarrow S(1/(nV_\downarrow OUT)+1/V_\downarrow (REC(PK, MIN)^\uparrow 2)$
where n is the primary to secondary turns ratio in the transformer T1; $V_{OUT}$ is the string voltage on the LEDs 102; and $V_{REC(PK,MIN)}$ is the minimum peak rectified input voltage.

As described above, the capacitor CFF is chosen to make a low-pass filter with the resistor RFF so as to filter the AC component of the rectified line voltage. The low pass filter may have a pole of between 10 Hz and 12 Hz to provide approximately 20 dB of attenuation at 120 Hz. Therefore, the value of the capacitor $C_{FF}$ may be calculated as follows:

$$C_{FF} \geq \frac{1}{2\pi (10 \text{ Hz} - 12 \text{ Hz}) R_{FF}} \quad \text{Equation (3)}$$

Slow integral compensation is achieved by way of the capacitor $C_{COMP}$, which may have a value of between 4.7 and 10.0 µF in order to have a low bandwidth loop of between 1 Hz and 10 Hz. The output of the amplifier 126 is input to the non-inverting input of the comparator 140 where the PWM signal is generated. The output of the amplifier 140 eventually drives the switch $Q_{SW}$ as described above.

The switch $Q_{SW}$ controls the current flow through the primary side of the transformer T1. By controlling the current flow through the transformer T1 based on the above-described parameters, the power to the primary side of the transformer T1 is maintained. The power output on the secondary side of the transformer T1 is proportional to the power on the primary side, therefore, controlling the power input to the primary side of the transformer T1 controls the power output on the secondary side. The secondary side of the transformer drives the LEDs 102.

As briefly described above, the power factor of the circuit 100 is relatively high because the circuit uses a DCM flyback converter that behaves like a resistor. More specifically, the input current $I_{IN}(t)$ is calculated as follows:

$$I_{IN}(t) = \frac{V_{IN}(t)}{L_M} D^2 T_S \quad \text{Equation (4)}$$

where D is the duty cycle and $T_S$ is the switching period based on the ramp generated by the ramp generator 142 and valley detection circuit as described in greater detail below. As shown, both $I_{IN}(t)$ and $V_{IN}(t)$ are sinusoidal and in phase. Therefore, the power factor is close to unity when the circuit 100 is operated in a non dimming mode. The power factor is not as relevant when the circuit 100 is operated in a dimming mode.

The circuit 100 has been described above as operating in a non-dimming mode. The circuit 100 will now be described operating using dimming functions. The dimming is provided by a conventional dimmer (not shown) that may be incorporated into the line voltage 104. The dimmer may operate by clipping a portion of the sinusoidal voltage used in a common AC voltage source. A conduction angle is the portion of the sinusoidal wave that is not clipped by the dimmer.

Figures 2, 4:
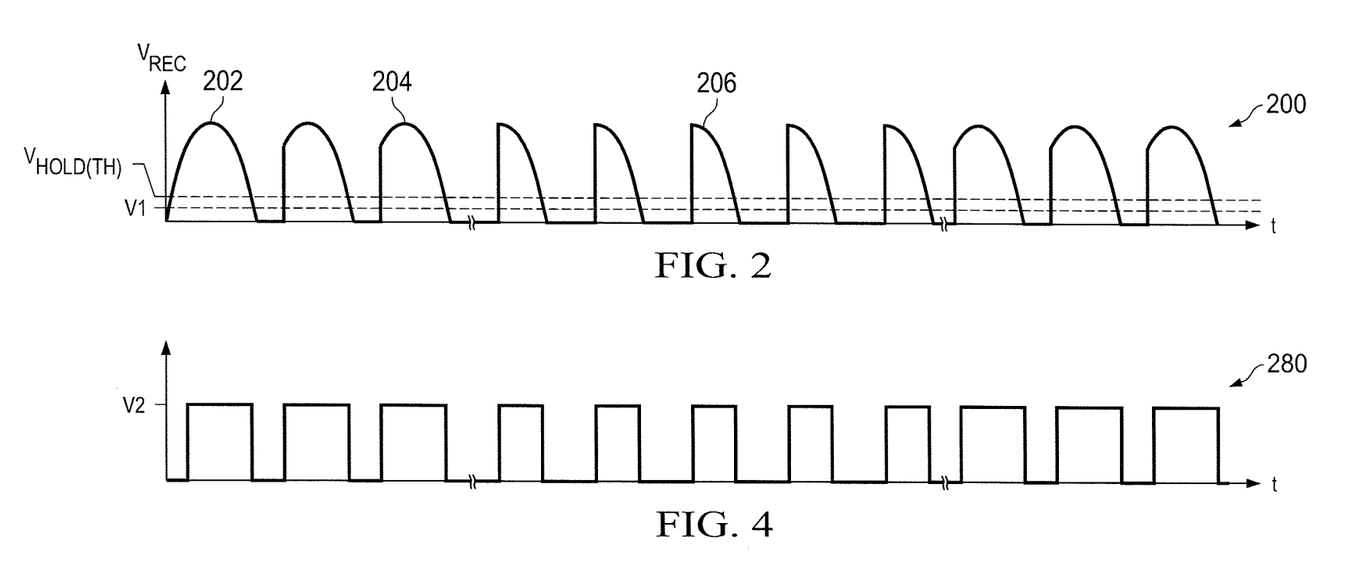
FIG. 2 is a graph showing different levels of the input voltage after being subjected to dimming and rectification.
FIG. 4 is a pulse width modulated signal generated from the signal of FIG. 2.

An example of a clipped rectified voltage 200 is shown in FIG. 2. This is the voltage that is present on the line 112 as a result of different levels of dimming. A wave 202 shows a rectified sine wave with no dimming. A wave 204 is the result of leading edge clipping. As shown, the conduction angle of the wave 204 is less than the conduction angle of the wave 202. As more dimming is applied, the conduction angle decreases and a wave such as the wave 206 is generated, which has a conduction angle less than the wave 204.

Figure 3:
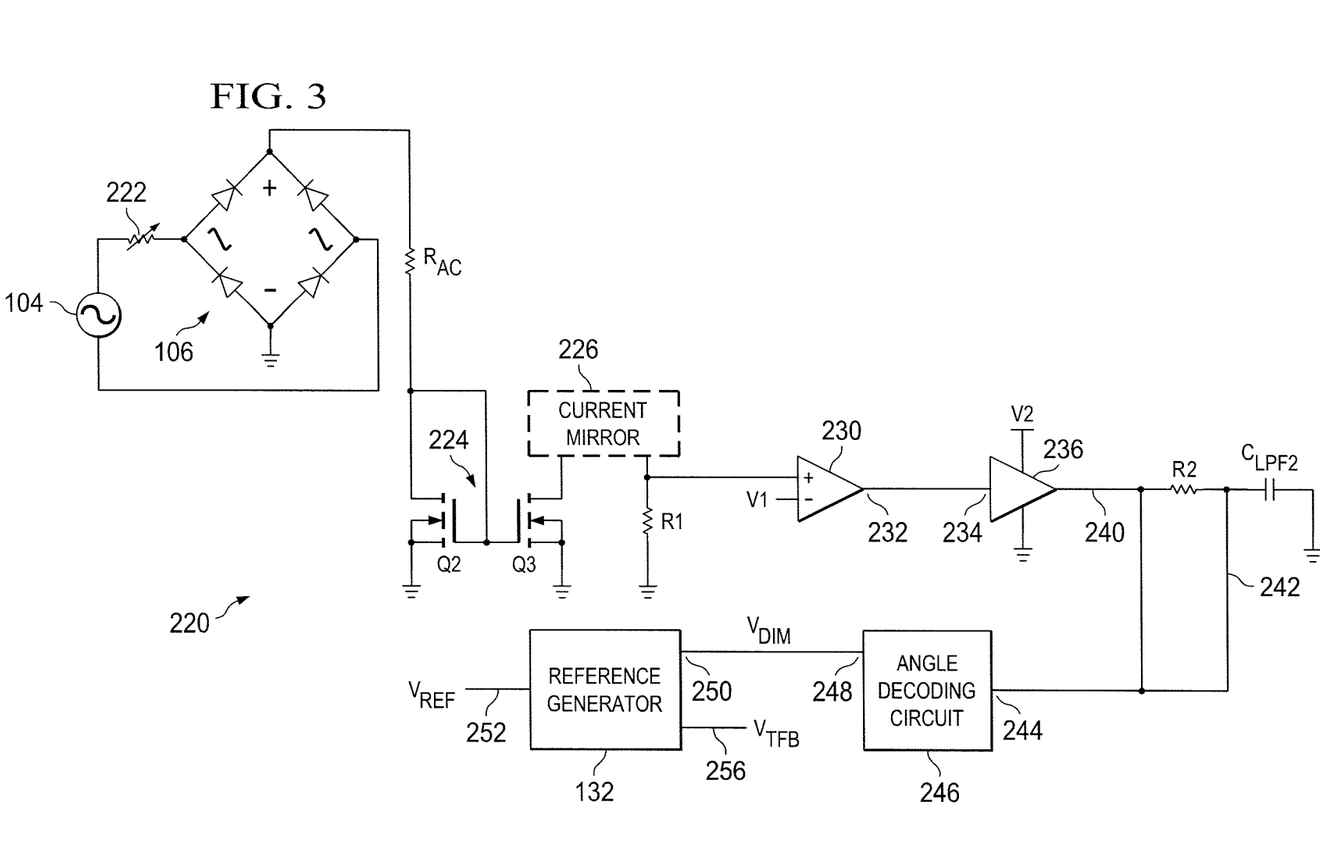
FIG. 3 is a block diagram of an embodiment of a dimming circuit used in conjunction with the circuit of FIG. 1.

The voltage $V_{REF}$ output by the reference generator 132 is proportional to the conduction angle of the rectified line voltage. A block diagram of a circuit 220 for generating the reference signal $V_{REF}$ is shown in FIG. 3. The circuit 220 includes an input 224 wherein the input 224 is connected to the line 112 by way of the resistor $R_{AC}$. The input consists of FETs Q2 and Q3 wherein the FET Q3 draws current between its drain and source from a current mirror 226. The current mirror 226 may be located within the feedforward circuit 118 of FIG. 1. In the embodiment of FIG. 3, the current mirror 226 is a 10:1 current mirror. The voltage at the input 224 is attenuated and recreated across a resistor R1, which may have a value of approximately 40 kΩ.

The voltage across the resistor R1 is input to the non-inverting input of a comparator 230. The inverting input of the comparator 230 is connected to a predetermined voltage V1, which may be approximately 280 mV. The voltage V1 is used to set the lower threshold in which dimming is detected and to generate a PWM signal representative of the rectified line voltage. More specifically, the voltage V1 is used to detect the lower threshold of the conduction angle where dimming will be applied to the LEDs 102, FIG. 1. The comparator 230 has an output 232 that is connected to the input 234 of a driver or buffer 236. The buffer 236 is powered by or has an output voltage that is limited to a voltage V2. In some embodiments, the voltage V2 may be approximately 1.75V.

The buffer 236 has an output 240 that is connected to a low-pass filter 242. In the embodiment of FIG. 3, the low-pass filter 242 consists of a resistor R2 and a capacitor C2. The pole of the low-pass filter 242 is set to attenuate the frequency of the rectified voltage, which is twice the frequency of the line voltage 104. More specifically, the AC component of the voltage of the output 240 is attenuated so that only the DC component, or the RMS value, passes the low-pass filter 242.

The output of the low-pass filter 242 is connected to the input 244 of an angle decoding circuit 246. The angle decoding circuit 246 translates the voltage at the input 244 to a voltage $V_{DIM}$ at the output 248 which is linearly related to the voltage at the input 244. The output 248 is connected to the input 250 of the reference generator 132. The reference generator 132 has an output 252 where the reference voltage $V_{REF}$ is present. The reference generator 132 may also have an input 256 that is connected to a thermal feedback voltage $V_{TFB}$. The voltage $V_{TFB}$ is representative of the operating temperature of the LEDs 102, FIG. 1, and may be used to reduce the power output to the LEDs 102 if their operating temperature is above a predetermined threshold.

Having described the components of the circuit 220, its operation and design will now be described. The circuit 220 receives the input current through $R_{AC}$ and Q2. The current is replicated through Q3 and scaled down by the current mirror 226. In the embodiment described herein, the current mirror is a 10:1 current mirror. An attenuated representation of the input voltage is then replicated across the resistor R1. It is noted that the value of the resistor $R_{AC}$ is proportional to the threshold dimming voltage divided by the current into the input 224. The current may be the value of V1 divided by the value of the resistor R1 and multiplied by the value of the current mirror 226. In some embodiments, the threshold voltage for 120V systems is set between 25V and 40V and for 220V or 230V systems, the threshold voltage is between 50V and 80V. The LEDs 102 may be turned off when the input voltage is below the threshold voltage.

The voltage at the non-inverting input to the comparator 230 is compared to the voltage V1. Reference is made to FIG. 2, where the rectified voltage 200 is compared to the voltage V1, which is shown as a dashed line. The output of the comparator 230 is a PWM signal wherein the duty cycle corresponds to the common area of the rectified voltage 200 and the voltage V1. The output of the comparator 230 is connected to the buffer 236 that saturates the input signal and produces a signal 280 as shown in FIG. 4.

Figure 5:
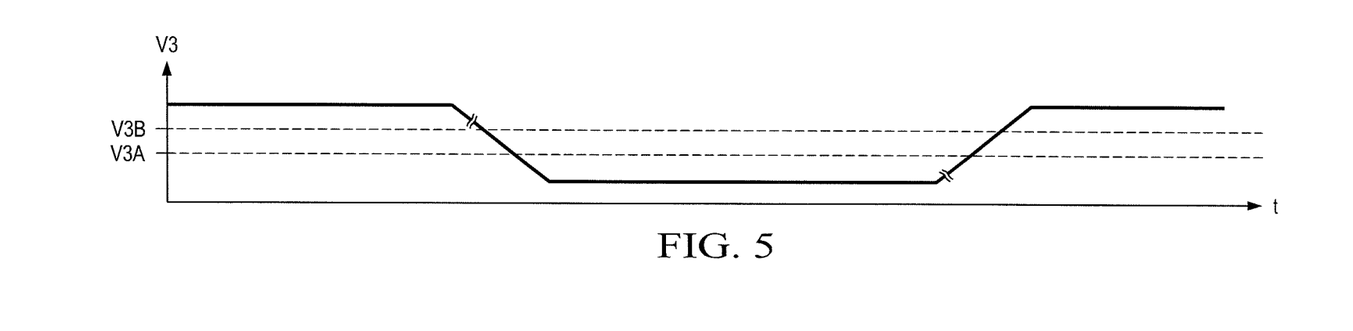
FIG. 5 is the signal of FIG. 4 with the AC component attenuated.
Figure 6:
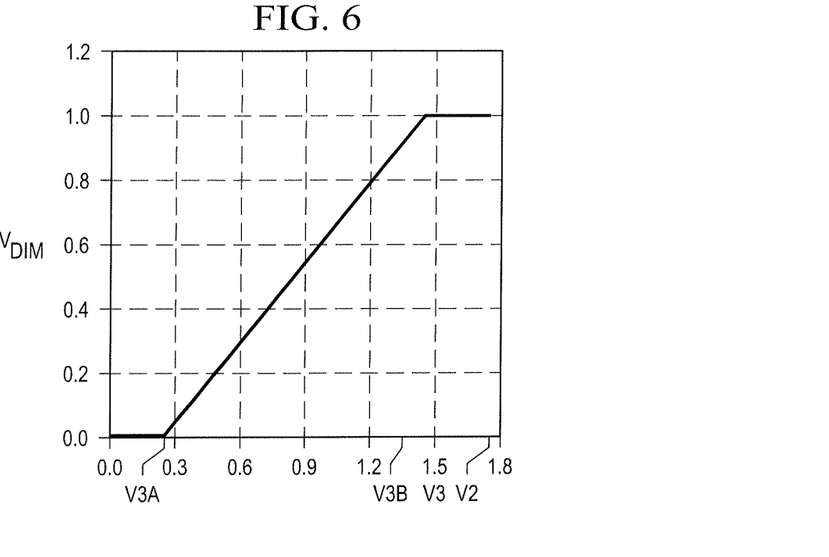
FIG. 6 is a graph showing the relationship between conduction angle and a voltage $V_{DIM}$ that is used to generate the reference voltage of FIG. 1.

The voltage of FIG. 4 passed through the low-pass filter 242, wherein the result is a voltage V3 that is shown in FIG. 5. The voltage V3 has the AC component attenuated and is a DC representation of the PWM signal of FIG. 4. The voltage V3 is input to the angle decoding circuit 246. The voltage V3 represents the conduction angle of the rectified line voltage and the angle decoding circuit 246 converts the voltage V3 to a linear relationship between the voltage V3 and its output $V_{DIM}$. Reference is made to FIG. 6 which is a graph depicting the relationship between the voltage V3 and the voltage $V_{DIM}$. The voltage $V_{DIM}$ is linearly dependent on the voltage V3 when the voltage V3 is between a voltage $V3_A$ and a voltage $V3_B$. The voltage $V3_A$ may be approximately 280 mV and the voltage $VA_B$ may be approximately 1.45 volts.

In the embodiment of FIG. 6, no dimming occurs when the voltage V3 is between zero and $V3_A$ volts. In this situation, the conduction angle may be less than thirty degrees and the voltage $V_{DIM}$ may be approximately 13 mV. As such, the LEDs 102 may be turned off. When the voltage V3 is greater than $V3_B$, the conduction angle may be from one hundred fifty degrees to one hundred eighty degrees. In this situation, no dimming may occur and the voltage $V_{DIM}$ is held constant, which in the embodiment of FIG. 6 is approximately one volt. In this range, the LEDs 102 may be powered at full power. In the linear range, when the voltage V3 is between $V3_A$ and $V3_B$, the voltage V3 is linearly related to the voltage $V_{DIM}$, which may correspond to a conduction angle of thirty degrees to one hundred fifty degrees. Dimming occurs during this linear range.

The voltage $V_{DIM}$ is output to the reference generator 132. The reference generator may change the voltage $V_{DIM}$ to generate the reference voltage $V_{REF}$. The reference voltage $V_{REF}$ was described above under no dimming conditions as being one volt. This corresponds to a conduction angle of between one hundred thirty degrees and one hundred eighty degrees where the voltage $V_{DIM}$ is saturated at one volt. The reference generator 132 may have an input 256 that is connected to a voltage $V_{TFB}$. The voltage $V_{TFB}$ is a thermal feedback signal indicating the operating temperature of the LEDs 102, FIG. 1. The voltage $V_{TFB}$ may be connected to a resistor or other thermal transducer located proximate the LEDs 102. When the voltage $V_{TFB}$ drops below a predetermined level, the LEDs 102 have exceeded a predetermined operating temperature. At this time, the reference generator 132 reduces the reference voltage $V_{REF}$, which reduces the power to the primary side of the transformer T1 and reduces the power to the LEDs 102. As the LEDs 102 cool, the voltage $V_{TFB}$ changes and the reference voltage $V_{REF}$ rises to increase the power output to the LEDs 102.

Having described the circuit 100 and its operation, methods of operating the circuit 100 will now be described. Reference is made to the flowchart 320 of FIG. 7, which describes a broad method for driving the LEDs 102. At step 322, the conduction angle is measured and a signal representative of the conduction angle is generated. It is noted that generating a signal representative of the conduction angle may constitute measuring the conduction angle. The signal representative of the conduction angle is the voltage $V_{REF}$ generated by the reference generator 132.

Figure 7:
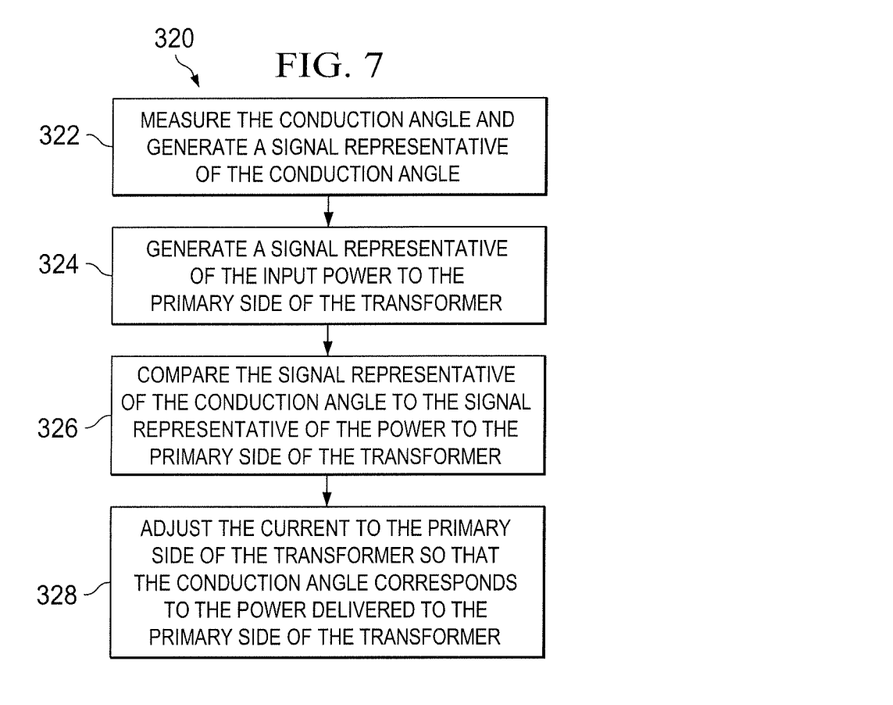
FIG. 7 is a flowchart describing an embodiment of the operation of the circuits of FIGS. 1 and 3.

At step 322, a signal representative of the input power to the primary side of the transformer T1 is generated. This signal is located at the inverting input of the amplifier 126. At step 326, the signal from step 322 is compared to the signal at step 324. The comparison is achieved by the amplifier 126 wherein the output of the amplifier 126 is representative of the difference. At step 328, the current driving the primary side of the transformer T1 is set or changed depending on the output of the amplifier 126. This is accomplished by changing the duty cycle of the PWM signal driving the switch $Q_{SW}$.

The basic circuit 100 and its operation have been described above. Different embodiments of the circuit 100 will now be described.

Figure 8:
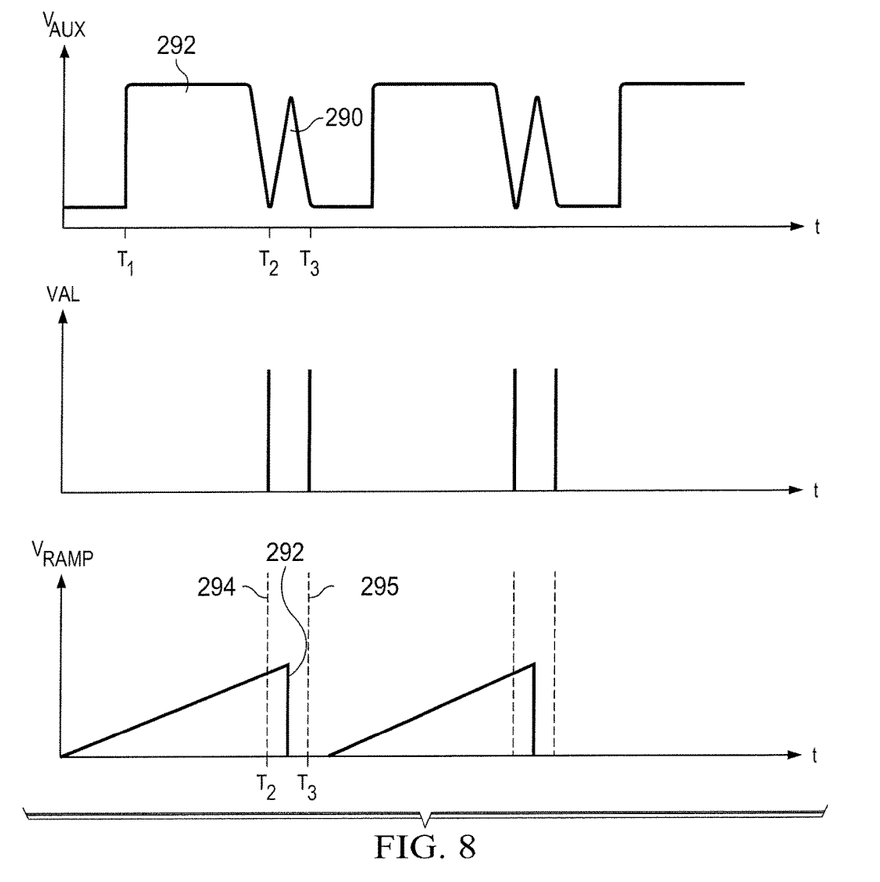
FIG. 8 is a graph showing ringing on the primary side of the transformer T1.

The circuit 100, FIG. 1, uses the transformer T1, which can induce ringing across the switch $Q_{SW}$, which may induce losses in the switch $Q_{SW}$. In order to lower the losses in the switch $Q_{SW}$, a valley detection circuit 350, FIG. 1, may be used. The valley detection circuit 350 uses an auxiliary winding 352 on the primary side of the transformer T1 wherein the voltage on this auxiliary winding 352 is monitored. An example of the voltage on the auxiliary winding 350 showing ringing in the monitored voltage $V_{AUX}$ is shown in FIG. 8. The voltage $V_{AUX}$ has a rising edge occurring at $T_1$ followed by a falling edge at $T_2$. A single ring 290 occurs between $T_2$ and $T_3$. The period between $T_2$ and $T_3$ corresponds to the time in which the switch $Q_{SW}$ is supposed to be on as determined by the ramp wave generated by ramp generator 142.

In order to lower switch losses and reduce electromagnetic interference, the switch $Q_{SW}$ can be forced to turn on at the lowest point in the ring 290. To determine the minimum value of the ring 290, the circuit 100 may rely on the valley detection circuit 350. During non-dimming operation, a ramp 292 corresponding to a fixed frequency set by the ramp generator 142 is generated. This frequency corresponds to the shortest duration of operation of the switch $Q_{SW}$, which is less than a period corresponding to the time between zero and T3. In the embodiments described herein, the ramp 292 has a period of approximately 14.5 μs.

In the embodiment of FIG. 8, there are two valleys 294 and 295 detected during each period. The valley 294 is detected during the period of the ramp 292 and will not cause the switch $Q_{SW}$ to turn on. After the period of the ramp 292 has ended, the second valley 295 is detected, which causes the switch $Q_{SW}$ to turn on. When the switch $Q_{SW}$ turns on, another ramp wave is generated. Therefore, the switch $Q_{SW}$ is turned on at the detection of a valley and after the expiration of the period of the ramp 192. The period of the ramp may be set by the ramp generator 142.

It is noted that valley detection may introduce frequency jitter that can affect the output of the LEDs 102 during dimming. The frequency jitter may cause visible flicker in the LEDs 102. For example, if a valley is detected at the end of the ramp 192, the valley detection circuit 350 may detect the valley during or after the ramp period during alternating cycles, which will cause flicker. In order to overcome this problem, the valley detection may be disabled when a conduction angle below a predetermined value is detected. For example, referring to FIG. 6, when the value of $V_{DIM}$ is less than $V3_B$, the valley detection may be disabled.

The circuit 100, FIGS. 1 and 3, includes a reference generator 132. As described above, the reference generator 132 generates the reference voltage used by the amplifier 126. As shown in FIG. 3 and as described above, the reference generator 132 may receive data on the input 256 related to the temperature of the LEDs 102 and may reduce the reference voltage $V_{REF}$ is the temperature of the LEDs 102 is above a predetermined value.

Figure 9:
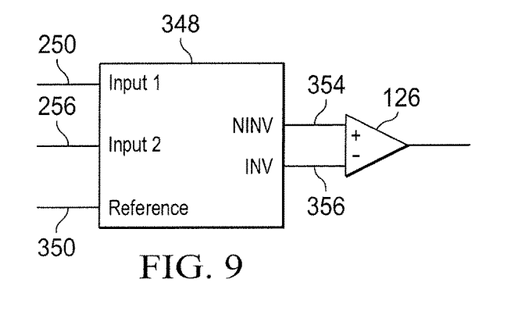
FIG. 9 is a block diagram of an embodiment of an analog OR circuit used as the reference generator of FIGS. 1 and 3.

The reference generator 132 may be an analog OR circuit 348 as shown in FIG. 9. The analog OR circuit 348 includes a first input 250, which is connected to the angle decoding circuit 246. A second input 256 is connected to the temperature sensor and is the input for the voltage $V_{TFB}$. The analog OR circuit 348 also includes a reference input 350 that may be connected to the output 120 of the feedforward circuit 118, FIG. 1. The analog OR circuit 348 includes two outputs, a non-inverting output 354 and an inverting output 356. The inverting and non-inverting outputs 354, 356 are connected to the respective inputs of the amplifier 126. It is noted that the use of the analog OR circuit 348 slightly changes the configuration of the circuit 100, but the operation remains substantially the same. If the input 250 is less than the input 256, then the output of 354 is the voltage of the input 250; otherwise, the output is the voltage on the input 256. In the embodiments as applied to FIGS. 1 and 3, the reference input 350 is connected directly to the inverting output 356, which is connected to the inverting input of the amplifier 126.

Figure 10:
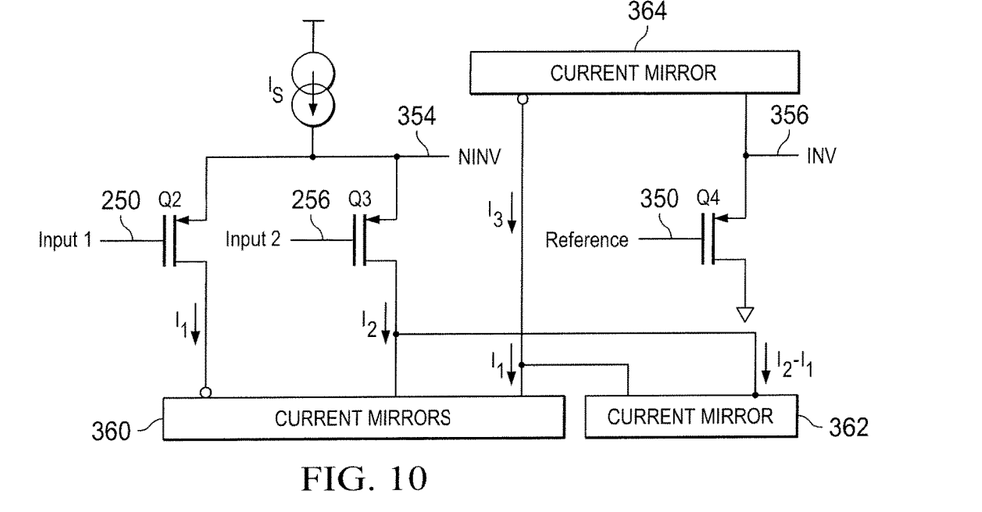
FIG. 10 is a schematic illustration of the analog OR circuit of FIG. 9.

A schematic illustration of the analog OR circuit 348 is shown in FIG. 10. The circuit 348 includes a current source $I_S$ that is connected to a current mirror 360 by way of a FET Q2 and a FET Q3. The input 250 is the gate of the FET Q2 and the input 256 is the gate of the FET Q3. The non-inverting output 354 is the source of the FETS Q2 and Q3. The drain of the FET Q3 is connected to a current mirror 362, wherein the current flowing from the drain of the FET Q3 to the current mirror 362 is the current I3 minus the current I1. The reference input 350 is connected to the gate of a FET Q4 and the inverting output is connected to the source of the FET Q4. If the voltage at the input 250 is less than the voltage at the input 256, then the current I3 is equal to the current I1; otherwise the current I3 is equal to the current I2.

In some embodiments, the operation of the circuit may change from regulating the power driving the LEDs 102 to regulating the current driving the LEDs. For example, during dimming operation, the LEDs 102 may be driven by applying a regulated power based on the conduction angle of the line voltage 104 as described above. During full power operation that does not include dimming, the LEDs 102 may be driven by a regulated current.

Figure 11:
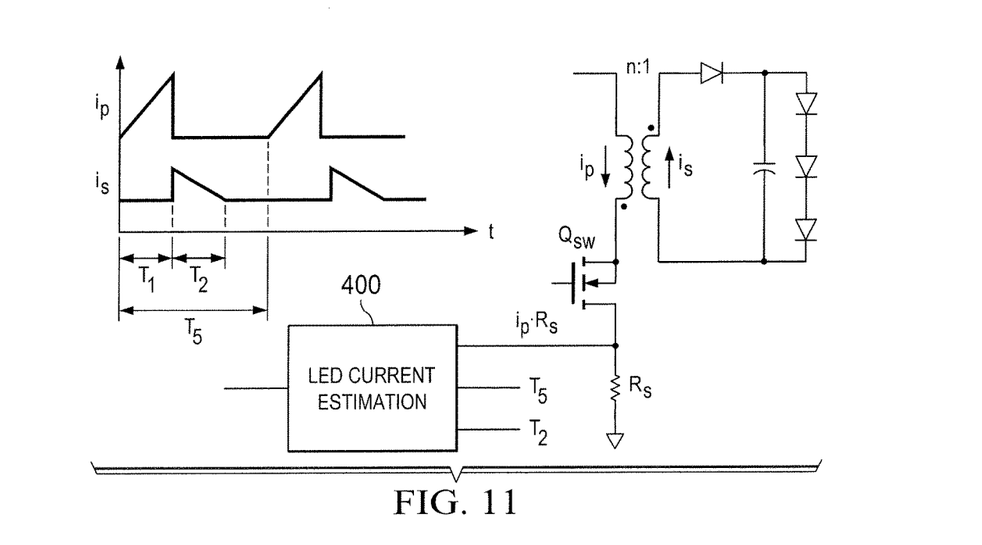
FIG. 11 is a diagram showing LED current estimation.

Referring to FIG. 11, the current flow $I_P$ through the primary side of the transformer T1 and the current flow IS through the secondary side of the transformer T1 is shown. The current IS is proportional to the current IP multiplied by the ratio of T2 to TS. The winding ratio n of the transformer T1 will also affect the current IS. An LED estimation circuit 400 senses the voltage across the sensing resistor $R_S$, wherein the voltage is equal to the resistance $R_S$ multiplied by the current IP.

Figure 12:
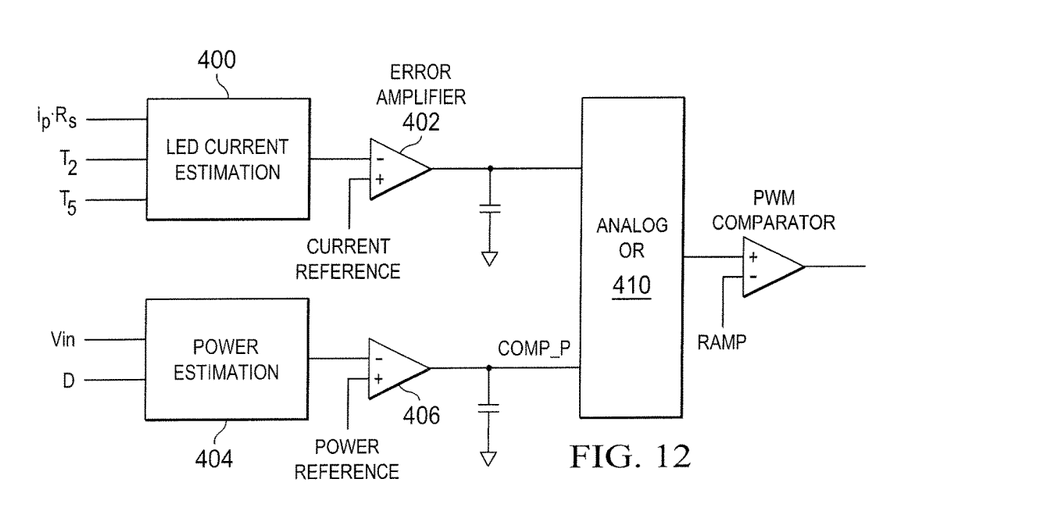
FIG. 12 is a diagram showing the LED current estimation used in the circuit of FIG. 1.

Referring to the block diagram of FIG. 12, the output of the LED current estimation circuit 400 is connected to a comparator 402 where it is compared to a current reference voltage. A power estimation circuit 404 determines the power based on the input voltage on the line 112 multiplied by the duty cycle D. The output of the power estimation circuit 404 is input to a comparator 406 where it is compared to a power reference voltage. The outputs of the comparators 402, 406 are input to an analog OR circuit 410 as described above. The analog OR circuit selects the lower of the two outputs to generate the driving signal for the switch QSW. The output of the analog OR 410 may be used as the non-inverting input to the comparator 140, FIG. 1. In high power conditions of no or little dimming, the LED current estimation circuit 400 drives the switch $Q_{SW}$ based on current regulation. As dimming occurs, the power estimation circuit 404 drives the switch $Q_{SW}$ as described above.

Figure 13:
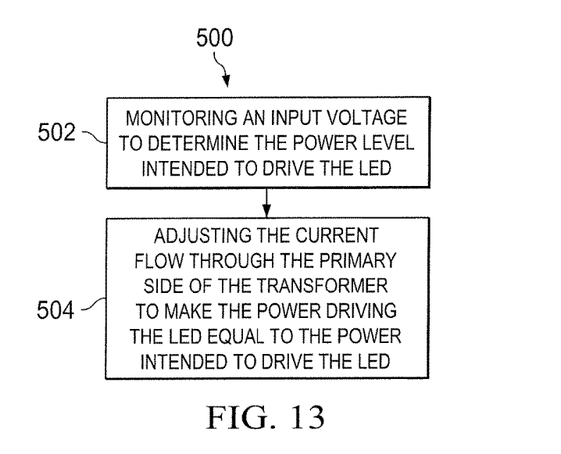
FIG. 13 is a block diagram describing a method of operating the circuit of FIG. 1.

FIG. 13 is a block diagram illustrating a method 500 for driving an LED from a secondary side of a transformer. The method includes, as shown at 502, monitoring an input voltage to determine the power level intended to drive the LED. The method also includes as shown at 504, adjusting the current flow through the primary side of the transformer to make the power driving the LED equal to the power intended to drive the LED.

The foregoing description of specific embodiments driving an LED has been presented for purposes of illustration and description. The specific embodiments described are not intended to be exhaustive or to suggest a constraint to the precise forms disclosed, and many modifications and variations are possible in light of the above teaching. The illustrated embodiments were chosen and described in order to best explain principles and practical application, to thereby enable others skilled in the art to best utilize the various embodiments with various modifications as are suited to the particular use contemplated. It is intended that the language of the claims appended hereto be broadly construed so as to cover different embodiments of the structures and methods expressly disclosed here, except as limited by the prior art.

What is claimed is:

1. A method for driving an LED from a secondary side of a transformer; the method comprising:
  operating circuitry on a primary side of the transformer by:

continuously monitoring duty cycle of an input voltage to determine the power level intended to drive the LED by detecting a conduction angle of the input voltage;

decoding the conduction angle to generate a dimming profile representative of the intended brightness of the LED;

adjusting the current flow through the primary side of the transformer utilizing the dimming profile to make the power driving the LED equal to the power intended to drive the LED; and continuously monitoring the input voltage to determine amplitude thereof; and adjusting current through the primary side of the transformer utilizing feed forward control to control current through the LED, wherein power to drive the LED remains constant, and wherein all control of power to the LED is performed in the primary side circuitry.

2. A method for driving an LED from a secondary side of a transformer; the method comprising:

monitoring an input voltage to determine the power level intended to drive the LED; and adjusting the current flow through the primary side of the transformer to make the power driving the LED equal to the power intended to drive the LED, wherein current flow through the primary side of the transformer is a pulse width modulated signal and wherein the adjusting comprises:

multiplying the duty cycle of the pulse width modulated signal by the input voltage to yield a product;

comparing the product to a reference voltage that is representative of the power level intended to be delivered to the LED to yield an error; and adjusting via a feed forward control the current flow through the primary side of the transformer based on the error, wherein power delivered to the LED remains constant.

3. The method of claim 2, wherein the input voltage has a conduction angle associated therewith and wherein the power level intended to drive the LED is related to the conduction angle.

4. The method of claim 3, further comprising powering the LED to a predetermined level when the conduction angle exceeds a predetermined value.

5. The method of claim 3, further comprising powering the LED to a predetermined level when the conduction angle is less than a predetermined value.

6. The method of claim 5, wherein the predetermined level constitutes no power being delivered to the LED.

7. The method of claim 2, wherein the primary side of the transformer is driven by way of a pulse width modulated signal.

8. The method of claim 7, wherein the duty cycle of the pulse width modulated signal is related to the power on the primary side of the transformer.

9. The method of claim 8, wherein the adjusting comprises adjusting the duty cycle of the pulse width modulated signal.

10. The method of claim 2, further comprising monitoring the voltage on the primary side of the transformer to determine if ringing occurs and not driving the primary side of the transformer during the ringing.

11. The method of claim 2, further comprising:

monitoring the temperature of the LED; and lowering the power to the primary side of the transformer when the temperature is above a predetermined value.

12. The method of claim 2, wherein the RMS value of the input voltage is multiplied by the duty cycle of the pulse width modulated signal.

13. A circuit for driving an LED, the circuit comprising:

a transformer having a primary side and a secondary side wherein the LED is connected to the secondary side;

an input connected to the primary side of the transformer, wherein a voltage at the input is representative of the power to be delivered to the LED;

a current regulator connected in series with the primary side of the transformer;

a control circuit that controls the current regulator based on the voltage continuously monitored input voltage;

an angle decode circuit for generating a dimming profile representative of intended brightness for the LED that matches characteristics of a dimmer; and a circuit for adjusting the current flow through the primary side of the transformer utilizing the dimming profile to make the power driving the LED equal to the power intended to drive the LED.

14. A circuit for driving an LED, the circuit comprising:

a transformer having a primary side and a secondary side wherein the LED is connected to the secondary side;

an input connected to the primary side of the transformer, for continuously monitoring a voltage at the input that is representative of the power to be delivered to the LED;

a current regulator connected in series with the primary side of the transformer; and a control circuit that controls the current regulator based on the voltage at the input, wherein the control circuit:

drives the current regulator with a pulse width modulated signal;

multiplies the duty cycle of the pulse width modulated signal with the voltage at the input yielding a product;

compares the product to a reference voltage that is representative of the power intended to be delivered to the LED to yield an error; and controls the current regulator based on the error, wherein power delivered to the LED remains constant.

15. The circuit of claim 14, wherein the voltage at the input has a conduction angle associated therewith and wherein the power to be delivered to the LED is proportional to the conduction angle.

16. The circuit of claim 14, wherein the current regulator is a switch.

17. The circuit of claim 14, wherein the current regulator is controlled with a pulse width modulated signal.

18. The circuit of claim 14, wherein the control circuit monitors the power on the primary side of the transformer.

19. The circuit of claim 14, further comprising an input that is connectable to a temperature sensor on the LED, wherein the control circuit reduces the power to the primary side of the transformer when the temperature sensor indicates that the temperature of the LED has exceeded a predetermined value.

20. A circuit for driving an LED, the circuit comprising:

a transformer having a primary side and a secondary side, the secondary side being connected to the LED, the primary side being driven by a signal having a conduction angle, wherein the conduction angle is proportional to dimming intended to applied to the LED;

a current regulator connected in series with the primary side of the transformer;

a control circuit that controls the current regulator based on the voltage continuously monitored input voltage; and an angle decode circuit for generating a dimming profile that matches characteristics of a dimmer;

wherein the primary side of the transformer is driven based on current regulation when the dimming determined by the dimming profile is below a predetermined value; and wherein the primary side of the transformer is driven based on power regulation when the dimming determined by the dimming profile is greater than the predetermined value.

\* \* \* \* \*